(12) United States Patent
Lee et al.

(10) Patent No.: US 12,545,775 B2
(45) Date of Patent: *Feb. 10, 2026

(54) POLYMER COMPLEX

(71) Applicant: LG Chem, Ltd., Seoul (KR)

(72) Inventors: Su Hee Lee, Daejeon (KR); In Young Kim, Daejeon (KR); Yulliana Kim, Daejeon (KR); Kwang Seoung Jeon, Daejeon (KR); Minsung Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 907 days.

This patent is subject to a terminal disclaimer.

(21) Appl. No.: 17/767,296

(22) PCT Filed: May 31, 2021

(86) PCT No.: PCT/KR2021/006741
§ 371 (c)(1),
(2) Date: Apr. 7, 2022

(87) PCT Pub. No.: WO2021/242068
PCT Pub. Date: Dec. 2, 2021

(65) Prior Publication Data
US 2022/0372263 A1 Nov. 24, 2022

(30) Foreign Application Priority Data

May 29, 2020 (KR) .................. 10-2020-0065204
Jul. 13, 2020 (KR) .................. 10-2020-0086346
(Continued)

(51) Int. Cl.
*C08L 23/12* (2006.01)
*C08L 67/02* (2006.01)
(Continued)

(52) U.S. Cl.
CPC .............. *C08L 23/12* (2013.01); *C08L 67/02* (2013.01); *D01D 5/423* (2013.01); *D01F 2/28* (2013.01);
(Continued)

(58) Field of Classification Search
CPC .. C08L 67/02; C08L 1/02; C08L 23/12; C08L 25/06; C08K 3/22; C08K 3/013;
(Continued)

(56) References Cited

U.S. PATENT DOCUMENTS 3,997,503 A * 12/1976 Henman .............. C08K 5/0008
524/265
4,374,178 A 2/1983 Kulkarni et al.
(Continued)

FOREIGN PATENT DOCUMENTS

CN 101647077 A 2/2010
CN 102317542 A 1/2012
(Continued)

OTHER PUBLICATIONS

Extended European Search Report including Written Opinion for Application No. 21813867.5 dated Nov. 3, 2022, pp. 1-6.
(Continued)

*Primary Examiner* — Catherine S Branch
*Assistant Examiner* — Olga Lucia Donahue
(74) *Attorney, Agent, or Firm* — Lerner David LLP (57) ABSTRACT

The present disclosure relates to a polymer complex comprising microcellulose fibers comprising nanofibrils and fine particles; and a polymer matrix. According to the present disclosure, there is provided a polymer complex capable of exhibiting excellent mechanical properties while being environmentally friendly by including cellulose fibers as a reinforcing material.

13 Claims, 6 Drawing Sheets

(30) Foreign Application Priority Data

May 31, 2021 (KR) ........................ 10-2021-0069785
May 31, 2021 (KR) ........................ 10-2021-0069786
May 31, 2021 (KR) ........................ 10-2021-0069787

(51) Int. Cl.
| | |
|---|---|
| *D01D 5/42* | (2006.01) |
| *D01F 2/28* | (2006.01) |
| *D06M 11/83* | (2006.01) |
| *D06M 13/188* | (2006.01) |
| *D06M 13/503* | (2006.01) |
| *D21H 11/18* | (2006.01) |
| *D06M 101/06* | (2006.01) |

(52) U.S. Cl.
CPC .......... *D06M 11/83* (2013.01); *D06M 13/188* (2013.01); *D06M 13/503* (2013.01); *D21H 11/18* (2013.01); *C08L 2205/03* (2013.01); *C08L 2205/16* (2013.01); *D06M 2101/06* (2013.01); *D10B 2201/00* (2013.01); *D10B 2505/02* (2013.01)

(58) Field of Classification Search
CPC .. C08K 3/08; C08K 3/36; D01D 5/423; D01F 2/00; D01F 11/02
See application file for complete search history.

(56) References Cited

U.S. PATENT DOCUMENTS

| | | |
|---|---|---|
| 5,536,369 A | 7/1996 | Norlander |
| 6,270,883 B1 | 8/2001 | Sears et al. |
| 6,730,249 B2 | 5/2004 | Sears et al. |
| 8,722,773 B2 | 5/2014 | Hamilton et al. |
| 9,698,336 B2 | 7/2017 | Kim et al. |
| 10,450,452 B2 | 10/2019 | Lummerstorfer et al. |
| 10,794,006 B2 | 10/2020 | Phipps et al. |
| 2002/0000683 A1 | 1/2002 | Sears et al. |
| 2006/0036012 A1 | 2/2006 | Hayes et al. |
| 2009/0065975 A1 | 3/2009 | Sain et al. |
| 2010/0203313 A1 | 8/2010 | Olsson et al. |
| 2011/0175252 A1 | 7/2011 | Liu et al. |
| 2012/0136146 A1 | 5/2012 | Heiskanen et al. |
| 2012/0160433 A1 | 6/2012 | Vehvilainen et al. |
| 2012/0208933 A1 | 8/2012 | Hamilton et al. |
| 2013/0209772 A1 | 8/2013 | Sandstrom et al. |
| 2014/0182797 A1 | 7/2014 | Paltakari et al. |
| 2014/0272397 A1 | 9/2014 | Kim et al. |
| 2015/0357099 A1 | 12/2015 | Galland et al. |
| 2016/0208153 A1 | 7/2016 | Hede et al. |
| 2017/0058419 A1 | 3/2017 | Kim et al. |
| 2017/0072472 A1 | 3/2017 | Isogai |
| 2017/0306562 A1 | 10/2017 | Phipps et al. |
| 2018/0094181 A1 | 4/2018 | Tominaga et al. |
| 2019/0112478 A1 | 4/2019 | Peace et al. |
| 2019/0112479 A1 | 4/2019 | Peace et al. |
| 2019/0127556 A1 | 5/2019 | Maclean et al. |
| 2019/0241725 A1 | 8/2019 | Lummerstorfer et al. |
| 2020/0040531 A1 | 2/2020 | Thitiwutthisakul et al. |
| 2020/0062921 A1 | 2/2020 | Hara et al. |
| 2020/0157318 A1 | 5/2020 | Seo et al. |
| 2020/0199330 A1 | 6/2020 | Maclean et al. |
| 2020/0216624 A1 | 7/2020 | Hamilton et al. |
| 2020/0238333 A1 | 7/2020 | Itoh et al. |
| 2020/0248405 A1 | 8/2020 | Momin et al. |
| 2020/0306794 A1 | 10/2020 | Kuramochi et al. |
| 2020/0398308 A1 | 12/2020 | Okazaki et al. |
| 2020/0399832 A1 | 12/2020 | Phipps et al. |
| 2021/0025109 A1 | 1/2021 | Hasegawa et al. |
| 2021/0087713 A1 | 3/2021 | Fukui et al. |
| 2021/0102341 A1 | 4/2021 | Fukuoka et al. |
| 2021/0198463 A1 | 7/2021 | Ikura et al. |
| 2021/0222006 A1 | 7/2021 | Ono et al. |
| 2021/0261781 A1 | 8/2021 | Gane et al. |
| 2021/0285156 A1 | 9/2021 | Laleg et al. |
| 2022/0049071 A1 | 2/2022 | Matsusue et al. |
| 2022/0064390 A1 | 3/2022 | Backfolk et al. |
| 2022/0372263 A1 | 11/2022 | Lee et al. |
| 2023/0272557 A1 | 8/2023 | Park et al. |
| 2024/0166827 A1 | 5/2024 | Park et al. |
| 2024/0166851 A1 | 5/2024 | Park et al. |
| 2024/0166855 A1 | 5/2024 | Hwang et al. |

FOREIGN PATENT DOCUMENTS

| | | |
|---|---|---|
| CN | 104031366 A | 9/2014 |
| CN | 105531345 A | 4/2016 |
| CN | 108589266 A | 9/2018 |
| CN | 109162086 A | 1/2019 |
| CN | 109790681 A | 5/2019 |
| CN | 110041564 A | 7/2019 |
| CN | 110139959 A | 8/2019 |
| CN | 110382601 A | 10/2019 |
| CN | 111452352 A | 7/2020 |
| CN | 107793711 B | 9/2020 |
| CN | 107793708 B | 11/2020 |
| EP | 2236545 A1 | 10/2010 |
| EP | 2554588 A1 | 2/2013 |
| EP | 3441436 A1 | 2/2019 |
| IN | 102378777 A | 3/2012 |
| JP | H8259844 A | 10/1996 |
| JP | 3194241 B2 | 7/2001 |
| JP | 3704280 B2 | 10/2005 |
| JP | 2010143992 A | 7/2010 |
| JP | 2010221622 A | 10/2010 |
| JP | 2011088997 A | 5/2011 |
| JP | 2012007247 A | 1/2012 |
| JP | 2012087199 A | 5/2012 |
| JP | 2012532952 A | 12/2012 |
| JP | 2013035903 A | 2/2013 |
| JP | 2014-055323 A | 3/2014 |
| JP | 2014088478 A | 5/2014 |
| JP | 2015-513569 A | 5/2015 |
| JP | 2015221844 A | 12/2015 |
| JP | 2016176055 A | 10/2016 |
| JP | 2017226754 A | 12/2017 |
| JP | 2018193551 A | 12/2018 |
| JP | 6446834 B2 | 1/2019 |
| JP | 2019011523 A | 1/2019 |
| JP | 2019500508 A | 1/2019 |
| JP | 2019512591 A | 5/2019 |
| JP | 2019099687 A | 6/2019 |
| JP | 2019119983 A | 7/2019 |
| JP | 2020007496 A | 1/2020 |
| JP | 2020070379 A | 5/2020 |
| JP | 6733076 B2 | 7/2020 |
| JP | 2020114924 A | 7/2020 |
| JP | 2022548882 A | 11/2022 |
| KR | 20010075598 A | 8/2001 |
| KR | 20080086976 A | 9/2008 |
| KR | 20090078170 A | 7/2009 |
| KR | 20110120250 A | 11/2011 |
| KR | 101254784 B1 | 4/2013 |
| KR | 101407092 B1 | 6/2014 |
| KR | 101415636 B1 | 7/2014 |
| KR | 20160062765 A | 6/2016 |
| KR | 20170025551 A | 3/2017 |
| KR | 101808014 B1 | 12/2017 |
| KR | 101979185 B1 | 5/2019 |
| KR | 102017583 B1 | 10/2019 |
| KR | 20200115665 A | 10/2020 |
| KR | 102179831 B1 | 11/2020 |
| WO | 2013120752 A1 | 8/2013 |
| WO | 2015-170613 A1 | 11/2015 |
| WO | 2018105174 A1 | 6/2018 |
| WO | 2019065961 A1 | 4/2019 |
| WO | 2019142639 A1 | 7/2019 |
| WO | 2019163873 A1 | 8/2019 |
| WO | WO-2019203344 A1 * | 10/2019 ............ D06M 11/00 |
| WO | 2020050286 A1 | 3/2020 |
| WO | 2020071434 A1 | 4/2020 |
| WO | 2021242069 A1 | 12/2021 |

(56) References Cited

FOREIGN PATENT DOCUMENTS

| WO | 2023018030 A1 | 2/2023 |
|----|---------------|--------|
| WO | 2023018031 A1 | 2/2023 |
| WO | 2023018033 A1 | 2/2023 |

OTHER PUBLICATIONS

Extended European Search Report including Written Opinion for Application No. 21814089.5 dated Nov. 3, 2022, pp. 1-9.
Extended European Search Report including Written Opinion for Application No. 21814301.4 dated Nov. 10, 2022, pp. 1-11.
International Search Report for Application No. PCT/KR2022/003159 mailed Jun. 27, 2022, pp. 1-3.
Sahoo, K., et al., "Study of ultraviolet sensing properties of ZnO nanoparticles grown on cellulose fibers." Materials Today: Proceedings, Aug. 31, 2019, vol. 18, pp. 1156-1161.
Oromiehie, "Chemical Modification of Polypropylene by Maleic Anhydride: Melt Grafting, Characterization, and Mechanism," 2014, International Journal of Chemical Engineering and Applications, 5, 2, 117-122. (Year: 2014).
Search report from International Application No. PCT/KR2021/006738, mailed Aug. 30, 2021.
Vainio, U., et al., "Copper and copper oxide nanoparticles in a cellulose support studied using anomalous small-angle X-ray scattering." The European Physical Journal D, vol. 42, Published online: Jan. 31, 2007, pp. 93-101.
Sahoo, K., et al., "ZnO-cellulose Nanocomposite Powder For Application In UV Sensors." AIP Conference Process Proceedings, vol. 1832, Issue No. 1, Published online: May 23, 2017, document No. 050090, pp. 1-3.
Search report from International Application No. PCT/KR2021/006741, mailed Sep. 9, 2021.
Search report from International Application No. PCT/KR2021/006743, mailed Sep. 15, 2021.
Liu Jie et al: "Soluble soybean polysaccharide/nano zine oxide antimicrobial nanocomposite films reinforced with microfibrillated cellulose", International Journal of Biological Macromolecules, Elsevier BV, NL, vol. 159, May 16, 2020 (May 16, 2020), 793-803, XP086248301.
Extended European Search Report for Application No. 22763650.3 dated Sep. 13, 23, 8 pgs.

* cited by examiner

POLYMER COMPLEX

CROSS-REFERENCE TO RELATED APPLICATION(S)

The present application is a national stage entry under 35 U.S.C. § 371 of International Application No. PCT/KR2021/006741 filed on May 31, 2021, which claims priority from Korean Patent Applications No. 10-2020-0065204 filed on May 29, 2020, No. 10-2020-0086346 filed on Jul. 13, 2020, No. 10-2021-0069785 filed on May 31, 2021, No. 10-2021-0069786 filed on May 31, 2021, and No. 10-2021-0069787 filed on May 31, 2021, all the disclosures of which are incorporated herein by reference.

TECHNICAL FIELD

The present disclosure relates to a polymer complex containing microcellulose fibers including nanofibrils and fine particles.

BACKGROUND OF ART

Pulp refers to a lignocellulosic fibrous material obtained by chemically or mechanically separating cellulose fibers from wood, fiber crops, waste paper, rags, or the like. Cellulose fibers are mainly used in the paper industry, and are used as raw materials for nanocellulose.

Nanocellulose is being applied to research to improve physical properties of polymers by complexation with polymers. It is easy to recycle the polymer complex to which environmentally friendly nanocellulose is applied as a reinforcing material, unlike a polymer complex to which glass fiber is applied.

However, the process for producing nanocellulose from cellulose fibers is complicated and costly. In addition, there is a problem in that the cellulose fibers are deteriorated due to a high temperature in the process of complexation with polymers. Further, since the cellulose fibers and nanocellulose are easily aggregated in the polymer complex, it is very difficult to disperse them in the nanoscale, and thus there is a limitation in obtaining a sufficient reinforcing effect.

DETAILED DESCRIPTION OF THE INVENTION

Technical Problem

In the present disclosure, there is provided a polymer complex capable of exhibiting excellent mechanical properties while being environmentally friendly by including cellulose fibers as a reinforcing material.

Technical Solution

Hereinafter, the polymer complex according to embodiments of the present invention will be described.

The terms are used merely to refer to specific embodiments, and are not intended to restrict the present disclosure unless it is explicitly expressed.

Singular expressions of the present disclosure may include plural expressions unless they are differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

As used herein, 'nanofiber' or 'nanofibril' refers to a fiber having a minor axis diameter in the nanometer range, and 'microfiber' refers to a fiber having a minor axis diameter in the micrometer range. For example, the microfiber may be composed of a bundle of the nanofibers.

As used herein, 'pulp' refers to a lignocellulosic fibrous material obtained by chemically or mechanically separating cellulose fibers from wood, fiber crops, waste paper, rags, or the like.

As used herein, 'pulp fiber', 'cellulose fiber' or 'microcellulose fiber' refers to a microfiber made of cellulose. As used herein, 'cellulose nanofiber' refers to a nanofiber made of cellulose.

As used herein, 'fibrillation' refers to a phenomenon in which nanofibrils forming the internal structure of microcellulose fibers are released and raised like fluff on the microcellulose fibers.

As used herein, 'fibrillated cellulose fiber' refers to a microcellulose fiber in a state in which nanofibrils having a minor axis diameter in the nanometer range are raised like fluff on the microcellulose fiber by the fibrillation.

According to an embodiment of the present disclosure, there is provided a polymer complex containing microcellulose fibers including nanofibrils and fine particles; and a polymer matrix.

Cellulose nanofibers, which are biodegradable and environmentally friendly natural polymer materials, have recently attracted attention as a reinforcing material for plastics. However, the process of obtaining nanofibers by nanosizing (miniaturizing) microcellulose fibers is complicated and costly, resulting in a problem of increasing the cost of a polymer complex containing cellulose nanofibers as a reinforcing material.

As a result of continuous research by the present inventors, it was confirmed that when the microcellulose fibers are fibrillated by growing fine particles on the microcellulose fibers without nanoizing the microcellulose fibers, and then complexed with a polymer matrix, excellent mechanical properties equivalent to those to which cellulose nanofibers are applied could be exhibited. In addition, it was confirmed that various physical properties could be expressed from the fine particles included on the microcellulose fibers.

The polymer complex contains microcellulose fibers including nanofibrils and fine particles; and a polymer matrix.

The polymer matrix may be a thermoplastic resin.

For example, the polymer matrix may be at least one polymer selected from the group consisting of polyolefin, polyamide, styrenic polymer, and polycarbonate.

Specifically, the polymer matrix may be a polyolefin such as polyethylene and polypropylene; an aliphatic polyamide such as nylon-6 and nylon-66; aromatic polyamides such as aramid; a styrenic polymer such as polystyrene, acrylonitrile-butadiene-styrene copolymer, styrene-maleic anhydride copolymer, styrene-acrylonitrile copolymer, and styrene-butadiene-styrene copolymer; a polycarbonate obtained by polymerizing a polyol including bisphenol A, polyether polyol, polyester polyol, or a mixture thereof and phosgene.

The microcellulose fibers may be natural cellulose fibers obtained from wood such as softwoods or hardwoods. For example, the microcellulose fibers may be pulp fibers obtained by dissolving components other than cellulose from natural raw materials such as softwoods or hardwoods using caustic soda or sodium sulfate.

In general, fibrillation of microcellulose fibers means a phenomenon in which relatively large fibrils forming a membrane of cellulose fibers and their internal tissues are released through a process such as beating, and fine fibrils are formed on the surface like fluff.

In the present disclosure, the microcellulose fibers including nanofibrils and fine particles may be a fiber in which some of the fibrils forming the microcellulose fibers are released by the growth of the fine particles.

Figure 1A:
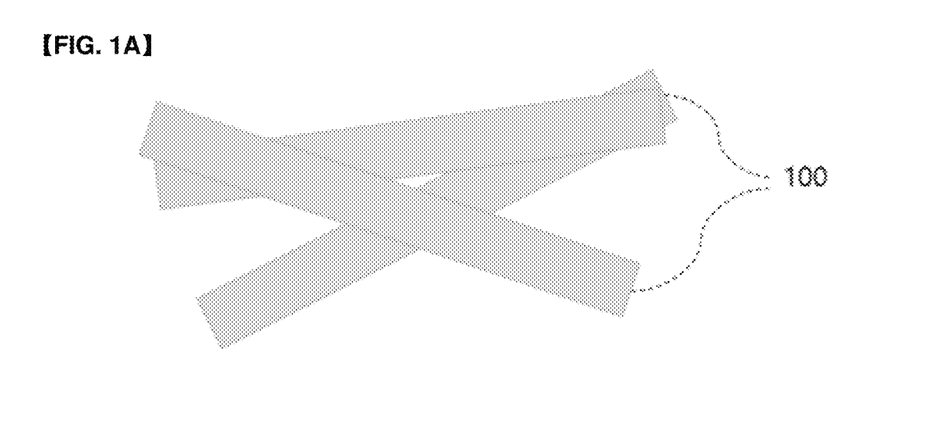
FIG. 1A is an enlarged schematic view of microcellulose fibers.
Figure 1B:
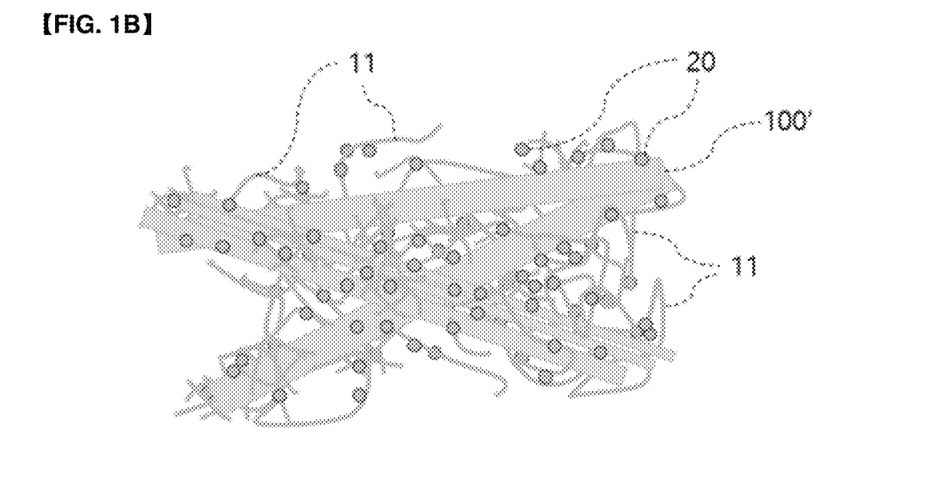
FIG. 1B is an enlarged schematic view of microcellulose fibers including nanofibrils and fine particles.

FIG. 1A is an enlarged schematic view of microcellulose fibers and FIG. 1B is an enlarged schematic view of microcellulose fibers including nanofibrils and fine particles.

In FIG. 1A, the microcellulose fiber 100 is a fiber having a minor axis diameter in the micrometer range. Referring to FIG. 1B, when fine particles are grown on the microcellulose fibers, some of the fibrils forming the microcellulose fibers 100 are released by the growth of the fine particles 20, thereby forming a fiber in which nanofibrils 11 are raised on the microcellulose fibers 100' like fluff. Also, the nanofibrils 11 may be present inside the microcellulose fibers 100' through fibrillation by the growth of the fine particles 20.

For example, the microcellulose fibers include nanofibrils and fine particles. Herein, the nanofibrils may be bonded to a surface of the microcellulose fibers. In addition, the nanofibrils may be present inside the microcellulose fibers. In addition, the fine particles may be bonded to the nanofibrils or bonded to a surface or inside of the microcellulose fibers.

In the microcellulose fibers including nanofibrils and fine particles, the microcellulose fibers may have a minor axis diameter of 1 μm or more; and 30 μm or less, 25 μm or less, 20 μm or less, 15 μm or less, or 10 μm or less. Specifically, the microcellulose fibers may have a minor axis diameter of 1 μm to 30 μm, 1 μm to 25 μm, 1 μm to 20 μm, 1 μm to 15 μm, or 1 μm to 10 μm.

And, in the microcellulose fibers including nanofibrils and fine particles, the nanofibrils may have a minor axis diameter of 10 nm or more, 20 nm or more, 30 nm or more, 50 nm or more, or 50 nm or more; and 400 nm or less, 350 nm or less, 300 nm or less, 250 nm or less, 200 nm or less, 150 nm or less, or 100 nm or less. Specifically, the nanofibrils may have a minor axis diameter of 10 nm to 400 nm, 10 nm to 350 nm, 10 nm to 300 nm, 20 nm to 300 nm, 20 nm to 250 nm, 30 nm to 250 nm, 30 nm to 200 nm, 40 nm to 200 nm, 40 nm to 150 nm, 50 nm to 150 nm, or 50 nm to 100 nm.

The microcellulose fibers including nanofibrils and fine particles may be prepared by adding a reducing agent, a catalyst, a ligand, or a mixture thereof to a mixture containing microcellulose fibers, a fine particle precursor, and a solvent to grow fine particles from the fine particle precursor distributed on the cellulose fibers.

For example, in the above process, a mixture containing microcellulose fibers, a fine particle precursor and a solvent is prepared.

An appropriate solvent capable of dissolving the fine particle precursor and swelling the microcellulose fibers may be used as the solvent. For example, water, alcohol (e.g., lower alcohol such as methanol, ethanol, propanol or butanol), dimethyl sulfoxide (DMSO), sodium hydroxide solution, ammonia solution, urea solution, or a mixture thereof may be used.

The solvent may be used in an amount of 1000 parts by weight to 10000 parts by weight based on 100 parts by weight of the microcellulose fibers. Within this range, the microcellulose fibers are sufficiently swollen, and fluidity of the fine particle precursor is ensured, so that the fine particle precursor can be uniformly dispersed on the microcellulose fibers.

It is possible to provide polymer complexes having various physical properties depending on the type of fine particles grown on the microcellulose fibers. That is, the fine particle precursor may be appropriately selected according to physical properties to be imparted to the polymer complex. For example, for the purpose of imparting antibacterial property and heat resistance to the polymer complex, a fine particle precursor capable of growing zinc oxide may be selected.

For example, the fine particles may include at least one element selected from the group consisting of copper, zinc, calcium, aluminum, iron, platinum, palladium, ruthenium, iridium, rhodium, osmium, chromium, cobalt, nickel, manganese, vanadium, molybdenum, and gallium. The components of the fine particles may be one type or two or more types.

The fine particle precursor may be a salt of at least one metal selected from the group consisting of copper, zinc, calcium, aluminum, iron, platinum, palladium, ruthenium, iridium, rhodium, osmium, chromium, cobalt, nickel, manganese, vanadium, molybdenum, and gallium. The salt may be an acetate, chloride, or nitrate. In addition, a silicon oxide precursor such as tetraethyl orthosilicate (TEOS) may be used as the fine particle precursor.

The fine particles may be contained in an amount of 1 to 30 parts by weight based on 100 parts by weight of the microcellulose fibers. Accordingly, the content of the fine particle precursor contained in the mixture may be controlled such that the content of fine particles finally prepared on the microcellulose fibers meet the above range. Within this range, sufficient fibrillation can be induced by uniformly distributing the fine particle precursor to the microcellulose fibers.

The mixture may be prepared by dissolving the fine particle precursor in the solvent, and then adding microcellulose fibers thereto. The mixture is stirred to swell the microcellulose fibers, and at the same time, the fine particle precursor is evenly distributed on the swollen microcellulose fibers. The fine particle precursor may be attached to the microcellulose fibers through hydrogen bonding or ionic bonding.

Herein, the type and content of the reducing agent, catalyst, and ligand contained in the mixture may be appropriately selected according to the added fine particle precursor, and the type and content of the fine particles to be grown. For example, the reducing agent may be sodium hydroxide (NaOH), a metal hydride-based reducing agent, a borohydride-based reducing agent, a borane-based reducing agent, a silane-based reducing agent, a hydrazine-based reducing agent, or a hydrazide-based reducing agent. As the catalyst, ammonia or urea may be used. As the ligand, benzene-1,3,5-tricarboxylate may be used.

Figure 3:
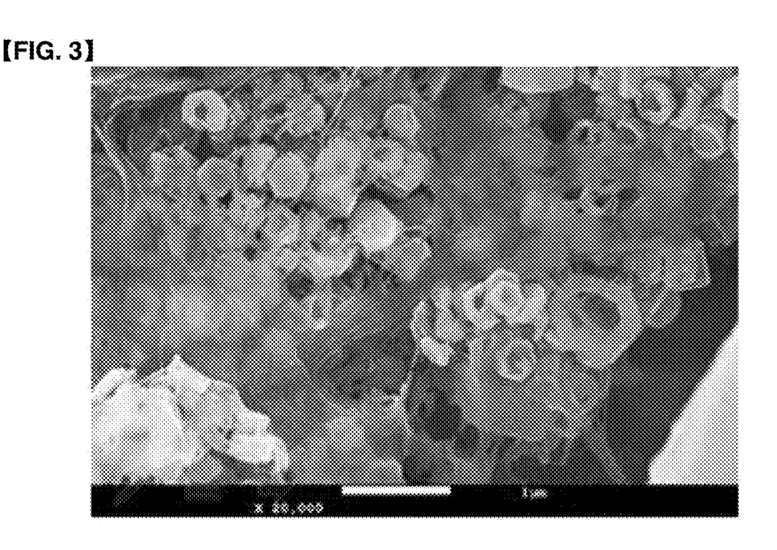
FIG. 3 is a SEM image of microcellulose fibers including nanofibrils and fine particles obtained in Example 1.

FIG. 3 is a scanning electron microscope (SEM) image of microcellulose fibers including nanofibrils and fine particles according to Example 1 below. Referring to FIG. 3, it can be confirmed that fibrillation occurred by the growth of fine particles on the cellulose fibers.

Optionally, after growing the fine particles on the microcellulose fibers, the fine particles may be modified to provide additional physical properties. For example, a process of modifying the fine particles by adding a lipophilic compound having a thiol group after growing the fine particles on the microcellulose fibers may be additionally performed. By modifying the fine particles to be lipophilic, compatibility between the microcellulose fibers and the polymer matrix may be further improved. Examples of the lipophilic compound having a thiol group include 1-decanethiol, 1-undecanethiol, 1-dodecanethiol, 1-tetradecanethiol, 1-pentadecanethiol, 1-hexadecanethiol, 1-octadecanethiol, and the like.

Through the above process, the microcellulose fibers including nanofibrils and fine particles can be obtained.

According to an embodiment of the present disclosure, the fine particles may have a minor axis diameter of 0.01 μm or more, 0.03 μm or more, or 0.05 μm or more; and 10 μm or less, 7 μm or less, or 5 μm or less. Preferably, the fine particles may have a minor axis diameter of 0.01 μm to 10 μm, 0.03 μm to 7 μm, or 0.05 μm to 5 μm.

When the diameter of the fine particles included in the microcellulose fibers is too large, the fine particles may act as defects, thereby reducing mechanical properties of the polymer complex. Thus, the diameter of the fine particles is preferably 10 μm or less, 7 μm or less, or 5 μm or less.

In addition, for sufficient fibrillation of the microcellulose fibers by the growth of fine particles, the diameter of the fine particles is preferably 0.01 μm or more, 0.03 μm or more, or 0.05 μm or more.

The fine particles may be spherical particles having a diameter of 0.01 μm to 10 μm. In addition, the fine particles may be columnar particles having a diameter of 0.01 μm to 10 μm on one axis and a diameter of 0.02 μm to 30 μm on another axis. The diameter of the fine particles may be measured using a scanning electron microscope. As a non-limiting example, the diameters, minor axis diameters, or major axis diameters of 20 fine particles are measured using a scanning electron microscope, respectively, and then an average value calculated by excluding the maximum and minimum values is obtained.

Preferably, the microcellulose fibers include fine particles having a particle diameter of 0.01 μm to 10 μm, and nanofibrils having a minor axis diameter of 10 nm to 400 nm are formed on the microcellulose fibers having a minor axis diameter of 1 μm to 30 μm.

According to an embodiment of the present disclosure, the fine particles may be included in an amount of 1 part by weight or more, 5 parts by weight or more, 8 parts by weight or more, or 10 parts by weight or more; and 30 parts by weight or less, 25 parts by weight or less, or 20 parts by weight or less based on 100 parts by weight of the microcellulose fibers. Preferably, the fine particles may be included in an amount of 1 to 30 parts by weight, 5 to 30 parts by weight, 5 to 25 parts by weight, 8 to 25 parts by weight, 10 to 25 parts by weight, or 10 to 20 parts by weight based on 100 parts by weight of the microcellulose fibers.

In order to sufficiently express the fibrillation effect of the microcellulose fibers by the growth of fine particles, the fine particles are preferably included in an amount of 1 part by weight or more, 5 parts by weight or more, or 10 parts by weight or more based on 100 parts by weight of the microcellulose fibers.

However, when the fine particles are included in an excessive amount on the microcellulose fibers, compatibility with the polymer matrix may be reduced, and thus mechanical properties of the polymer complex may be deteriorated. In addition, when the fine particles are included in an excessive amount, the fine particles are aggregated to form a non-uniform aggregate, and thus various physical properties may be deteriorated. Therefore, the fine particles are preferably included in an amount of 30 parts by weight or less, 25 parts by weight or less, or 20 parts by weight or less based on 100 parts by weight of the microcellulose fibers.

Meanwhile, the polymer complex may further include a compatibilizer dispersed on the polymer matrix. The compatibilizer is a component that helps the polymer matrix and the microcellulose fibers to be well blended with each other.

As the compatibilizer, those known in the art to which the present invention pertains may be used in consideration of the specific type of the polymer matrix.

Preferably, the compatibilizer may be a modified polyolefin. The modified polyolefin refers to a resin obtained by modifying a polyolefin with an unsaturated carboxylic acid or a derivative thereof.

The polyolefin forming the modified polyolefin may be a chain-type olefin such as ethylene, propylene, butene, pentene, hexene, and heptene; a cyclic olefin such as cyclopentene, cyclohexene, and 1,3-cyclopentadiene; an olefin substituted with an aromatic ring such as styrene, or the like.

The unsaturated carboxylic acid forming the modified polyolefin may include fumaric acid, maleic acid, itaconic acid, citraconic acid, aconitic acid, and anhydrides thereof.

As a non-limiting example, the modified polyolefin may be polypropylene or polyethylene in which 0.1 to 10 wt % thereof is grafted with maleic anhydride.

The modified polyolefin may further improve compatibility of cellulose fibers with a polymer matrix, thereby further improving mechanical properties of the polymer complex.

According to an embodiment of the present disclosure, the polymer complex may contain 50 to 90 wt % of the polymer matrix; 5 to 40 wt % of the microcellulose fibers including nanofibrils and fine particles; and 0.1 to 15 wt % of the compatibilizer. Preferably, the polymer complex may contain 55 to 90 wt % of the polymer matrix; 9 to 35 wt % of the microcellulose fibers including nanofibrils and fine particles; and 1 to 15 wt % of the compatibilizer. More preferably, the polymer complex may contain 55 to 85 wt % of the polymer matrix; 10 to 30 wt % of the microcellulose fibers including nanofibrils and fine particles; and 5 to 15 wt % of the compatibilizer.

In order to provide a polymer complex containing an appropriate amount of the matrix, the polymer matrix is preferably contained in the polymer complex in an amount of 50 wt % or more, or 55 wt % or more. In addition, for the expression of improved mechanical properties according to the present disclosure, the polymer matrix is preferably contained in the polymer complex in an amount of 90 wt % or less, or 85 wt % or less.

Similarly, for the expression of improved reinforcing effect according to the present disclosure, the microcellulose fibers including nanofibrils and fine particles are preferably contained in the polymer complex in an amount of 5 wt % or more, or 10 wt % or more. However, an excessive amount of the reinforcing material may impair compatibility with the polymer matrix, thereby reducing mechanical properties of the polymer complex. Therefore, it is preferable that the microcellulose fibers including nanofibrils and fine particles are contained in the polymer complex in an amount of 40 wt % or less, 35 wt % or less, or 30 wt % or less.

Further, in order to allow proper compatibility to be expressed, the compatibilizer may be contained in the polymer complex in an amount of 0.1 wt % or more, 1 wt % or more, or 5 wt % or more. However, an excessive amount of the compatibilizer may deteriorate mechanical properties of the polymer complex. Therefore, the compatibilizer is preferably contained in the polymer complex in an amount of 15 wt % or less.

According to an embodiment of the present disclosure, the polymer complex may be obtained by mixing the above-mentioned components in a mixer, followed by curing. As a non-limiting example, the polymer complex can be obtained by mixing the above-mentioned components in a batch mixer at 100 to 180° C., preparing a master batch in the form of pellets, and injecting the master batch into an extruder for extrusion and injection.

According to an embodiment of the present disclosure, the polymer complex may exhibit excellent mechanical properties while being environmentally friendly by containing the microcellulose fibers including nanofibrils and fine particles.

For example, the polymer complex may have flexural strength of 30 MPa or more, 40 MPa or more, 45 MPa or more, or 47 MPa or more; and 70 MPa or less, or 65 MPa or less, when measured according to ISO 178 for a specimen having a size of 80 mm×10 mm×4 mm prepared from the polymer complex. Preferably, the polymer complex may have flexural strength of 30 MPa to 70 MPa, 40 MPa to 70 MPa, 45 MPa to 70 MPa, 47 MPa to 70 MPa, or 47 MPa to 65 MPa.

In addition, the polymer complex may have flexural modulus of 1.0 GPa or more, 1.5 GPa or more, or 1.7 GPa or more; and 3.0 GPa or less, 2.5 GPa or less, or 2.0 GPa or less, when measured according to ISO 178 for a specimen having a size of 80 mm×10 mm×4 mm prepared from the polymer complex. Preferably, the polymer complex may have flexural modulus of 1.0 GPa to 3.0 GPa, 1.5 GPa to 3.0 GPa, 1.7 GPa to 2.5 GPa, or 1.7 GPa to 2.0 GPa.

ISO 178 provides a standard test method for determining flexural properties of plastics by performing a three-point bend test. The three-point bend test applies force at the midpoint of a rectangular specimen. The applied force is measured by a load cell, and the resulting deflection is measured by either crosshead displacement or by a direct strain measurement device. This may be performed by applying the force to the specimen at a constant speed in the range of 1 to 500 mm/min using a conventional flexural testing machine. The flexural strength is the maximum flexural stress obtained during the flexural test. The flexural stress is a function of applied load, span, specimen width, and specimen thickness, and measured using a flexural tester.

As another example, the polymer complex may have tensile strength of 20 MPa or more, 30 MPa or more, 33 MPa or more, or 35 MPa or more; and 50 MPa or less, 45 MPa or less, or 40 MPa or less, when measured according to ASTM D638-5 for a dog-bone-shaped specimen (or a dumbbell-shaped specimen) prepared from the polymer complex according to ASTM D638-5. Preferably, the polymer complex may have tensile strength of 20 MPa to 50 MPa, 30 MPa to 50 MPa, 33 MPa to 50 MPa, 35 MPa to 50 MPa, 35 MPa to 45 MPa, or 35 MPa to 40 MPa.

ASTM D638 provides a standard test method for determining the tensile properties of plastics. The tensile properties of the polymer complex are measured according to specimen Type V of ASTM D638. ASTM D638 is performed by applying a tensile force to the specimen and measuring the tensile properties of the specimen under stress. This may be performed at a constant tensile rate in the range of 1 to 500 mm/min until the specimen is broken (yield or fractured) using a conventional tensile testing machine. The tensile strength is the amount of force that can be applied until the specimen yields or breaks.

The polymer complex can exhibit improved mechanical properties while being environmentally friendly, and thus can be applied to various uses such as lightweight materials for automobiles, home appliances, and packaging materials.

Advantageous Effects

According to the present disclosure, there is provided a polymer complex capable of exhibiting excellent mechanical properties while being environmentally friendly by containing cellulose fibers as a reinforcing material. The polymer complex may exhibit improved mechanical properties while maintaining intrinsic properties of the polymer despite containing non-nanosized cellulose fibers. In particular, the microcellulose fibers including nanofibrils and fine particles are evenly dispersed in the polymer matrix without going through a complicated and expensive nano-processing, making it possible to provide a high-quality polymer complex economically and efficiently. The polymer complex may exhibit additional properties such as antibacterial property in addition to mechanical properties depending on the type of fine particles included in the microcellulose fibers.

DESCRIPTION OF SYMBOLS 100, 100': microcellulose fiber
11: nanofibril
20: fine particle

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

Example 1

Figure 2:
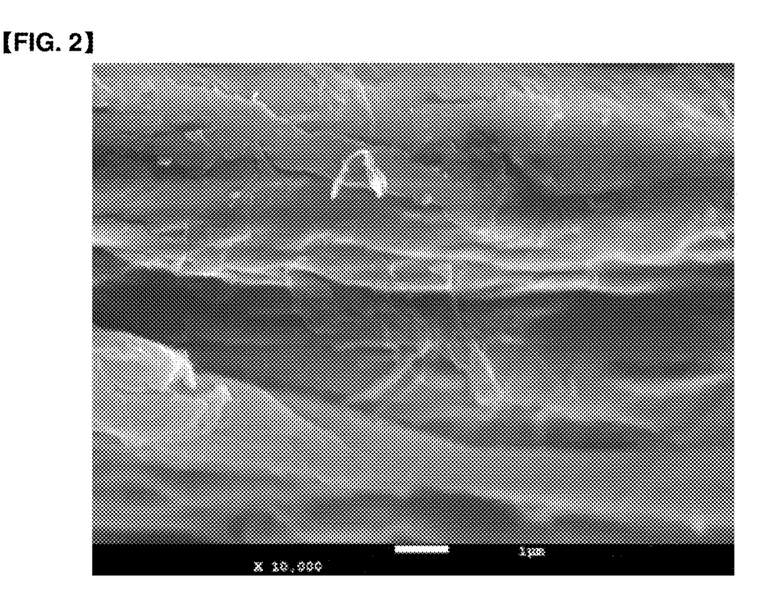
FIG. 2 is a scanning electron microscope (SEM) image of pulp fibers used in Example 1.

1) Preparation of Microcellulose Fibers Including Nanofibrils and Fine Particles Softwood kraft pulp fibers (cellulose fibers) were prepared as cellulose raw materials. Then, the shape of the pulp was observed using a scanning electron microscope (SEM image of FIG. 2).

20 g of the above pulp fibers were added to an aqueous solution in which 20 g of zinc acetate was dissolved in 1000 g of distilled water, and stirred at 500 rpm for 2 hours to prepare a mixture. In this mixture, zinc acetate was attached to the swollen pulp fibers through hydrogen bonding or ionic bonding.

Figure 5A:
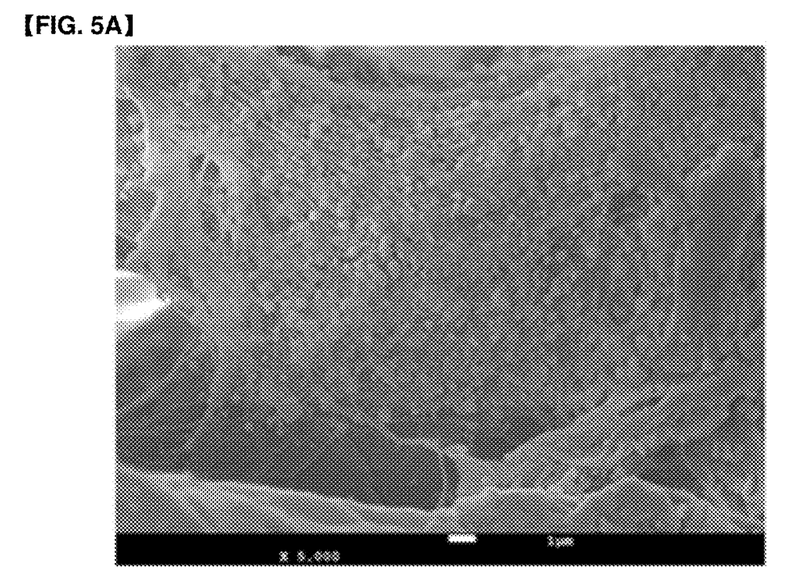
FIG. 5A shows a comparison of SEM images of fibrillated microcellulose fibers according to Example 1.
Figure 6A:
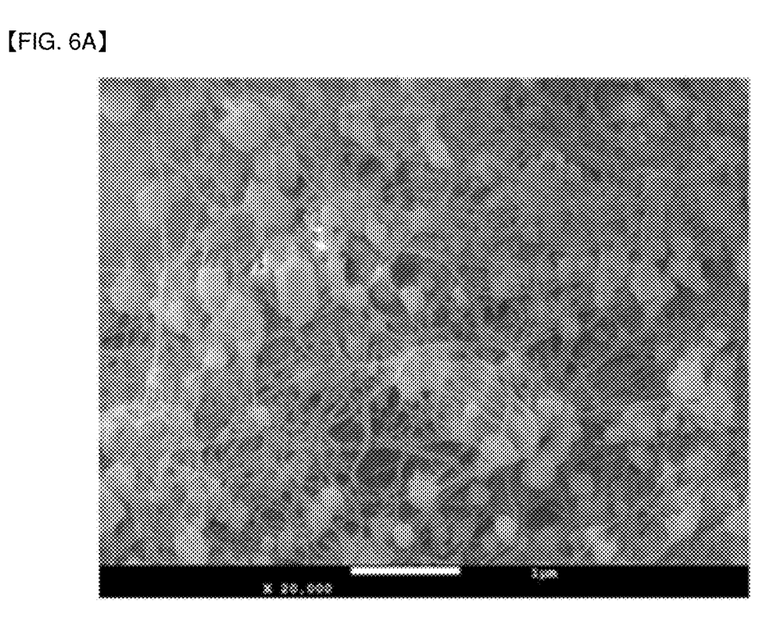
FIG. 6A is a comparison of SEM images of FIG. 5A taken at a higher magnification.

3.6 g of sodium hydroxide (NaOH) was added to the mixture at room temperature, and stirred at 500 rpm for 2 hours to grow fine particles on the pulp fibers. As shown in FIG. 3, FIG. 5A and FIG. 6A, it was confirmed using a scanning electron microscope that fibrillation occurred in the pulp fiber portion on which particles (ZnO) were grown.

By the above method, microcellulose fibers including nanofibrils and fine particles were obtained.

2) Preparation of Polymer Complex 10 wt % of microcellulose fibers including nanofibrils and fine particles, 85 wt % of polypropylene, and 5 wt % of compatibilizer were added to a batch mixer, and mixed at 170° C. for 20 minutes to prepare a master batch in the form of pellets. As the compatibilizer, maleic anhydride-grafted polypropylene was used.

Figure 7:
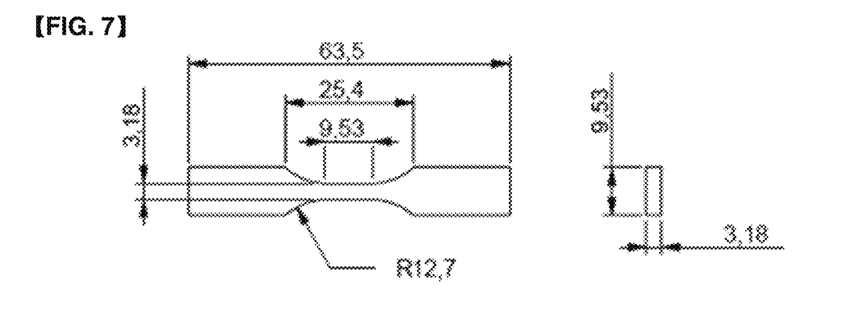
FIG. 7 shows specifications of a dog-bone-shaped specimen (or a dumbbell-shaped specimen) for measuring tensile strength according to Type V of ASTM D638 (unit: mm).

The master batch was put into a twin-screw extruder to perform a compounding process, and then extruded. The polymer complex thus obtained was put back into an injection machine and injected, and a specimen having a size of 80 mm×10 mm×4 mm according to ISO 178 and a dog-bone-shaped specimen according to Type V of ASTM D638 (see FIG. 7) were prepared.

Example 2

1) Preparation of Microcellulose Fibers Including Nanofibrils and Fine Particles 20 g of the same pulp fibers as in Example 1 were added to 1 L of a 0.05 M aqueous solution in which 9.08 g (0.05 mol) of copper acetate was dissolved in distilled water, and stirred at 500 rpm for 2 hours to prepare a mixture. In this mixture, copper acetate was attached to the swollen pulp fibers through hydrogen bonding or ionic bonding.

Figure 4:
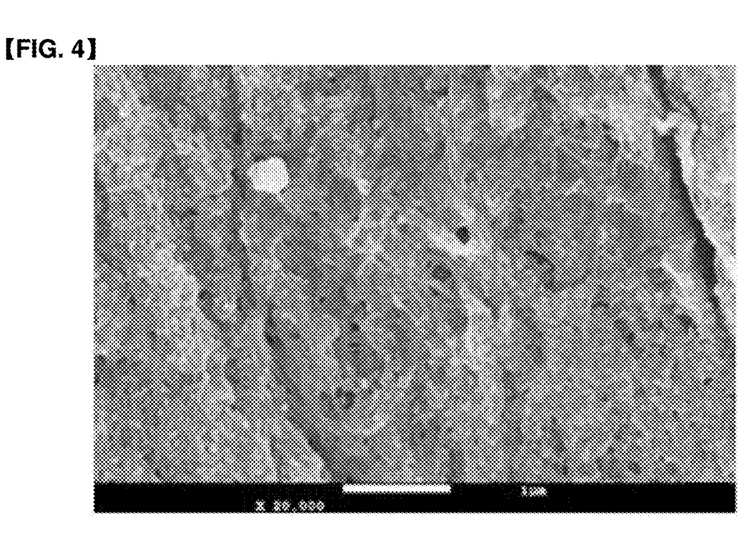
FIG. 4 is a SEM image of microcellulose fibers including nanofibrils and fine particles obtained in Example 2.

0.05 mol of benzene-1,3,5-tricarboxylate (BTC) was added to the mixture at room temperature, and stirred at 500 rpm for 2 hours to grow fine particles on the pulp fibers. As shown in FIG. 4, it was confirmed using a scanning electron microscope that fibrillation occurred in the pulp fiber portion on which particles (HKUST-1: Cu-BTC) were grown.

By the above method, microcellulose fibers including nanofibrils and fine particles were obtained.

2) Preparation of Polymer Complex 10 wt % of microcellulose fibers including nanofibrils and fine particles, 85 wt % of polypropylene, and 5 wt % of compatibilizer were added to a batch mixer, and mixed at 170° C. for 20 minutes to prepare a master batch in the form of pellets. As the compatibilizer, maleic anhydride-grafted polypropylene was used.

The master batch was put into a twin-screw extruder to perform a compounding process, and then extruded. The polymer complex thus obtained was put back into an injection machine and injected, and a specimen having a size of 80 mm×10 mm×4 mm according to ISO 178 and a dog-bone-shaped specimen according to Type V of ASTM D638 (see FIG. 7) were prepared.

Example 3

A polymer complex and specimens were prepared in the same manner as in Example 1, except that the content ratio of the microcellulose fibers including nanofibrils and fine particles, the polypropylene, and the compatibilizer was changed to 30:55:15 (wt %).

Comparative Example 1

Specimens were prepared in the same manner as in Example 1 using polypropylene, except that the microcellulose fibers including nanofibrils and fine particles and the compatibilizer were not added. The specimen is a neat polymer specimen.

Comparative Example 2

A polymer complex and specimens were prepared in the same manner as in Example 1, except that the same pulp fibers as in Example 1 soaked in water to swell were used instead of the microcellulose fibers including nanofibrils and fine particles.

Comparative Example 3

A polymer complex and specimens were prepared in the same manner as in Example 1, except that the microcellulose fibers including nanofibrils and fine particles were not added.

Comparative Example 4

1) Preparation of Miniaturized Cellulose Fibers Including Fine Particles

The same softwood kraft pulp fibers as in Example 1 were prepared as cellulose raw materials. A surface of the pulp fibers was oxidized using 2,2,6,6-tetramethylpiperidinyl-1-oxyradical (TEMPO) as a catalyst to obtain oxidized pulp.

1 g of the oxidized pulp was dispersed in 99 g of distilled water and miniaturized (defibrated) with a mixer for 30 minutes to obtain an aqueous dispersion of miniaturized cellulose at a concentration of 1%.

A zinc acetate aqueous solution was prepared by dissolving 20 g of zinc acetate in 1000 g of distilled water. 3.6 g of sodium hydroxide (NaOH) was dissolved in 10 ml of distilled water to prepare a sodium hydroxide solution.

While stirring 100 g of the aqueous dispersion of miniaturized cellulose at 15° C., 50 ml of the zinc acetate aqueous solution and 10 ml of the sodium hydroxide solution were added thereto, followed by stirring at 500 rpm for 2 hours to prepare a complex of zinc oxide (ZnO) particles and miniaturized cellulose.

Figure 5B:
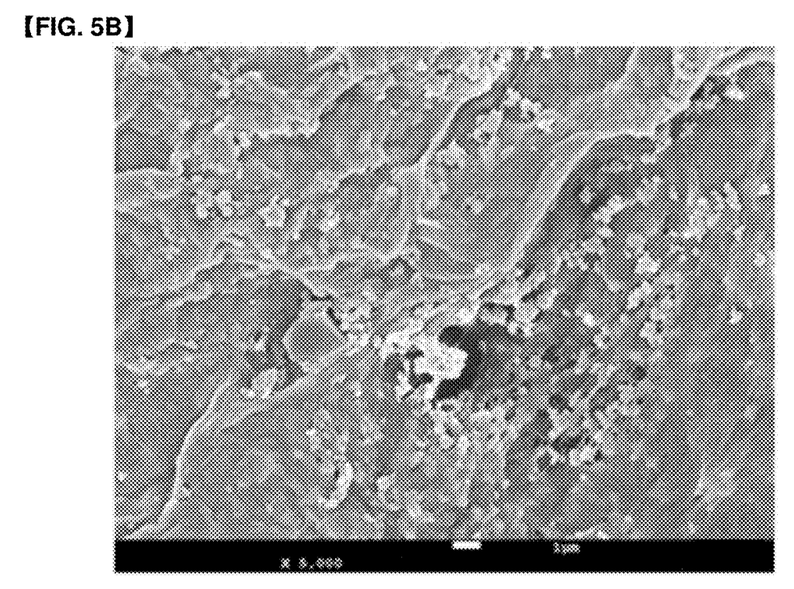
FIG. 5B shows a comparison of SEM images of miniaturized cellulose complexed with fine particles according to Comparative Example 4.
Figure 6B:
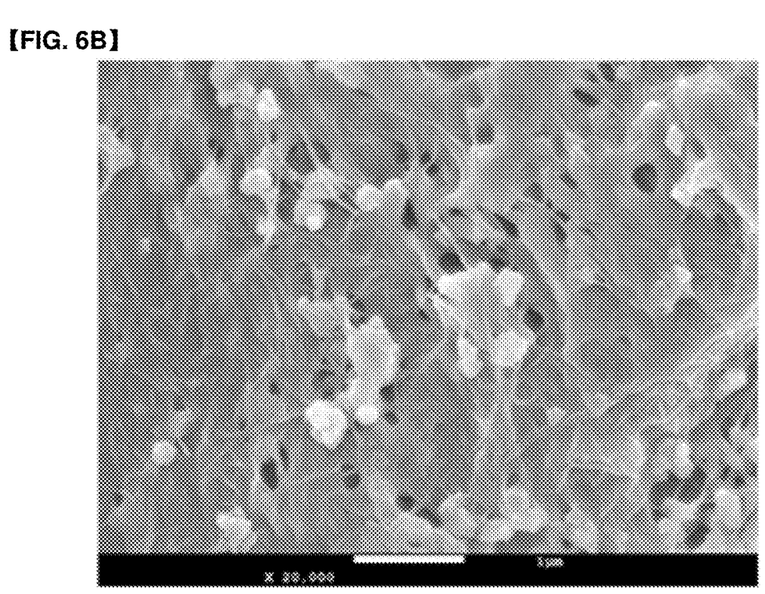
FIG. 6B is a comparison of SEM images of FIG. 5B taken at a higher magnification.

As shown in FIG. 5B and FIG. 6B, it was confirmed using a scanning electron microscope that the complex of zinc oxide particles and miniaturized cellulose according to Comparative Example 4 had strong bonding strength and aggregation between the miniaturized celluloses, so that nanofibers were aggregated and the dispersion degree of particles was low.

2) Preparation of Polymer Complex

A polymer complex and specimens were prepared in the same manner as in Example 1, except that a complex of zinc oxide (ZnO) particles and miniaturized cellulose was used instead of the microcellulose fibers including nanofibrils and fine particles.

Test Examples

The physical properties of the specimens prepared in Examples and Comparative Examples were evaluated by the following method, and the results are shown in Table 2 below.

1) Minor Axis Diameter of Fiber

The minor axis diameter of the microcellulose fibers (the shortest diameter in the cross section of fiber) prepared in Examples was measured using a scanning electron microscope.

Specifically, in the case of microcellulose fibers, the minor axis diameters of 10 microfibers per each sample were measured and displayed in a range excluding the maximum and minimum values. In the case of nanofibrils, the minor axis diameters of nanofibrils per each sample were measured, and displayed in a range excluding the maximum and minimum values.

In addition, in Comparative Example 4, the pulp fibers were miniaturized (defibrated), and then complexed with particles unlike Examples. The minor axis diameter of nanofibrils of Comparative Example 4 in Table 2 below means the minor axis diameter of the miniaturized cellulose after complexing with particles.

2) Flexural Strength and Flexural Modulus

A specimen having a size of 80 mm×10 mm×4 mm was prepared according to ISO 178. The specimen was left for 24 hours in a constant temperature and humidity room adjusted to a temperature of 23° C. and a relative humidity of 50%, and then subjected to a flexural test.

The flexural strength and flexural modulus of the specimen were measured according to ISO 178 using a universal testing machine (UTM) manufactured by Instron. In accordance with ISO 178, a supports span was set to 46 mm using a three-point flexural test jig, and flexural strength and flexural modulus were obtained by performing a flexural test under a crosshead speed of 5 mm/min.

3) Tensile Strength

The following specimen (FIG. 7) was prepared according to the standard of specimen Type V of ASTM D638. The specimen was left for 24 hours in a constant temperature and humidity room adjusted to a temperature of 23° C. and a relative humidity of 50%, and then subjected to a tensile test.

The tensile strength of the specimen was measured according to ASTM D638 using a universal testing machine (UTM) manufactured by Instron. In accordance with ASTM D638, a gap between the grips holding the specimen at both ends was set to 25.4 mm, and the test was performed at a constant tensile rate with a crosshead speed of 5 mm/min.

4) Antibacterial Property

Colonies of *E. coli* cultured in a solid medium were collected using a loop, inoculated in 5 mL of LB (Luria Bertani) liquid medium, and suspension-cultured at 37° C. for about 16 hours while stirring at 160 rpm. After centrifuging the cultured bacteria at 3000 rpm for 1 min and discarding the supernatant, an OD (optical density) value was measured at a wavelength of 600 nm using 5 mL 1×PBS. Thereafter, it was finally adjusted to OD 600=0.01 using 1×PBS solution.

50 $\mu\ell$ of bacteria adjusted to OD 600=0.01 was dropped into the center of a circular polymer complex having a diameter of about 2.5 cm sterilized with 70 wt % ethanol. After covering it with a round PET film having a diameter of about 2 cm, it was placed in a small petri-dish having a diameter of 6 cm, and then placed in an airtight container again. A filter paper moistened with water was placed in the airtight container to prevent the bacteria from drying out during culture. The sealed box was cultured for one day in an incubator at 37° C.

The cultured polymer complex was placed in a 50 mL tube containing 10 mL 1×PBS, and stirred at 180 rpm for 1 hour to disperse the bacteria in the liquid phase. 100 $\mu\ell$ of the culture solution and 100 $\mu\ell$ of the 10-fold diluted culture solution were taken. Then, they were smeared on LB agar medium until absorbed into the medium using glass beads, and cultured at 37° C. in an incubator for one day. After 24 hours, the number of colonies was counted and the number of bacteria reduced compared to the control group (PP) was calculated to calculate the antibacterial rate.

TABLE 1

|  | (a) | (b) | (b') | (c) |
|---|---|---|---|---|
| Example 1 | 85 | 10 | 0 | 5 |
| Example 2 | 85 | 10 | 0 | 5 |
| Example 3 | 55 | 30 | 0 | 15 |
| Comparative Example 1 | 100 | 0 | 0 | 0 |
| Comparative Example 2 | 90 | 0 | 10 | 0 |
| Comparative Example 3 | 95 | 0 | 0 | 5 |

(a) polymer matrix
(b) microcellulose fibers containing nanofibrils and fine particles
(b') unmodified pulp
(c) compatibilizer

TABLE 2

|  | Minor axis diameter | | Size of fine particles (μm) | Flexural strength (MPa) | Flexural modulus (GPa) | Tensile strength (MPa) | Antibacterial property (%) |
|---|---|---|---|---|---|---|---|
|  | Microcellulose fibers (μm) | Nanofibrils (nm) | | | | | |
| Example 1 | 1~10 | 50~100 | 0.1~1 | 48 | 1.7 | 35 | 30 |
| Example 2 | 1~10 | 50~100 | 0.05~0.1 | 47 | 1.8 | 35 | 90 |
| Example 3 | 1~10 | 50~100 | 0.1~1 | 62 | 1.9 | 38 | 99 |
| Comparative Example 1 | None | None | None | 40 | 1.2 | 30 | 0 |
| Comparative Example 2 | 1~10 | 100~500 | None | 46 | 1.7 | 31 | 0 |
| Comparative Example 3 | None | None | None | 42 | 1.3 | 31 | 0 |
| Comparative Example 4 | None | 10~100 | 0.1~1 | 45 | 1.7 | 31 | 30 |

Referring to Table 2, it was confirmed that the specimens of Examples could exhibit equivalent or higher mechanical properties compared to the specimens of Comparative Examples, and in particular, could also have antibacterial property as additional physical properties depending on the type of fine particles grown on the cellulose fibers.

As the specimen of Comparative Example 2 contained unmodified cellulose fibers, the improvement in tensile strength was very insignificant compared to that of the specimen of Comparative Example 1. As the specimen of Comparative Example 3 contained only the compatibilizer, it was confirmed that the improvement in mechanical properties was insignificant.

In the cellulose fibers prepared in Comparative Example 4, although the particles were grown on the miniaturized cellulose, re-aggregation of the miniaturized cellulose and the particles occurred excessively when complexed with the polymer matrix. The specimen of Comparative Example 4, which showed low dispersibility due to the re-aggregation, exhibited poor physical properties similar to those of Comparative Example 2.

The invention claimed is:

1. A polymer complex comprising microcellulose fibers; and a polymer matrix,
    wherein the microcellulose fibers comprise nanofibrils and fine particles, and the microcellulose fibers are fibrillated by growth of the fine particles on the microcellulose fibers,
    wherein the nanofibrils are bonded to a surface of the microcellulose fibers, and the fine particles are bonded to the nanofibrils and bonded to the surface and inside of the microcellulose fibers,
    wherein the microcellulose fibers have a minor axis diameter of 1 µm to 30 µm, and the nanofibrils have a minor axis diameter of 10 nm to 400 nm, and
    wherein the fine particles are particles with a minor axis diameter of 0.01 µm to 10 µm.

2. The polymer complex of claim 1,
    wherein the fine particles comprise one or more metal particles of copper, zinc, calcium, aluminum, iron, silver, platinum, palladium, ruthenium, iridium, rhodium, osmium, chromium, cobalt, nickel, manganese, vanadium, molybdenum, magnesium, strontium, titanium, zirconium, hafnium, or gallium, or silicon oxide particles.

3. The polymer complex of claim 1,
    wherein the fine particles are included in an amount of 1 to 30 parts by weight based on 100 parts by weight of the microcellulose fibers.

4. The polymer complex of claim 1,
    wherein the fine particles comprise spherical fine particles having a diameter of 0.01 µm to 10 µm, columnar particles having a diameter of 0.01 µm to 10 µm on one axis and a diameter of 0.02 µm to 30 µm on another axis, or a mixture thereof.

5. The polymer complex of claim 1,
    wherein the polymer matrix is a thermoplastic resin.

6. The polymer complex of claim 1,
    wherein the polymer matrix comprises at least one of polyolefin, polyamide, styrenic polymer, or polycarbonate.

7. The polymer complex of claim 1,
    further comprising a compatibilizer.

8. The polymer complex of claim 7,
    wherein the compatibilizer comprises a modified polyolefin.

9. The polymer complex of claim 7,
    wherein the polymer complex comprises 50 to 90 wt % of the polymer matrix;
    5 to 40 wt % of the microcellulose fibers comprising nanofibrils and fine particles; and
    0.1 to 15 wt % of the compatibilizer.

10. The polymer complex of claim 7,
    wherein the modified polyolefin is polypropylene or polyethylene in which 0.1 to 10 wt % thereof is grafted with maleic anhydride.

11. The polymer complex of claim 1,
    wherein a flexural strength measured according to ISO 178 for a specimen having a size of 80 mm×10 mm×4 mm prepared from the polymer complex is 30 MPa to 70 MPa.

12. The polymer complex of claim 1,
    wherein a flexural modulus measured according to ISO 178 for a specimen having a size of 80 mm×10 mm×4 mm prepared from the polymer complex is 1.0 GPa to 3.0 GPa.

13. The polymer complex of claim 1,
    which has a tensile strength measured according to ASTM D638-5 of 20 MPa to 50 MPa.

* * * * *